Patented Oct. 27, 1936

2,058,504

UNITED STATES PATENT OFFICE 2,058,504

METHOD OF IMPROVING SULPHONATED HYDROXY AROMATIC COMPOUNDS

Bryan L. Rauschert, Grapeview, Wash., assignor to National Aniline & Chemical Company, Inc., New York, N. Y., a corporation of New York No Drawing. Application November 24, 1933, Serial No. 699,566. Renewed February 28, 1936

14 Claims. (Cl. 260—155)

This invention relates to the improvement of the quality of sulphonated hydroxy aromatic compounds of the type AHRS, wherein A represents an aromatic nucleus which may contain substituents, H represents a nuclear hydroxyl group (that is one directly linked to the aromatic nucleus represented by A), R represents a nuclear alkyl group containing at least 5 carbon atoms, and S represents a nuclear sulphonic acid group in the form of a free acid or a salt. It relates more particularly to the improvement of the color in neutral, weakly acid and weakly alkaline, aqueous solutions of said sulphonated hydroxy aromatic compounds and especially of alkyl phenol sulphonic acid compounds of the type

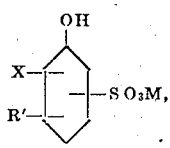

in which X represents hydrogen or a methyl group, R' represents a saturated or unsaturated alkyl hydrocarbon chain containing 5 or more carbon atoms, and M represents hydrogen, a metal, the ammonium radical or an organic ammonium radical.

Sulphonated hydroxy aromatic compounds of the type AHRS (wherein A, H, R and S have the meaning above given) have been proposed for use in the household, in the textile, insecticide, fungicide, tanning, and related industries, and in the manufacture of various chemical products and preparations. For example they have been proposed for use as wetting agents for textile fibers and solid materials of various kinds; as detergents, in neutral, acid, and alkaline solutions, alone or in admixture with other detergents, such as ordinary soaps, sulphates, and/or sulphonates of alcohols having more than 5 carbon atoms in an alkyl chain, etc; as penetrating agents for various liquids; as dispersing and emulsifying agents for liquids and solids of various types; as insecticides, fungicides, and parasiticides of other types, either alone or in combination with other ingredients; as agents for the treatment of textile fibers of all types by various processes including after-treatment, bleaching, bowking, cleaning, carbonizing, degreasing, dry-cleaning, dyeing, felting, finishing, fulling, greasing, impregnating, lathering, laundering, lubricating, mercerizing, mordanting, softening, scouring, sizing, stripping, washing, etc; as ingredients of cosmetic and pharmaceutical preparations; as sterilizing agents; as agents for breaking oil emulsions; as fat saponifying agents; as coupling components for azo dyes; as stabilizing agents for diazonium nitroso, and diazo amino preparations; as ingredients of oils and similar compositions for prevention of sunburn; and the like.

The sulphonated hydroxy aromatic compounds of the type AHRS include compounds in which the aromatic nucleus represented by A in the foregoing formula is derived from a carbocyclic or a heterocyclic, mononuclear or polynuclear aromatic compound and in which the aromatic nucleus represented by A may be free from substituents other than those designated by H, R and S in the foregoing formula; or it may contain one or more additional atoms or groups attached to the carbon or other atoms of the nucleus, the following being some of the possible substituents: one or more additional hydroxyl radicals besides that represented by H in the foregoing formula; one or more additional alkyl groups of the type represented by R in the foregoing formula, which may be the same or different; one or more additional sulphonic acid radicals (either in the acid or salt form) besides that represented by S in the foregoing formula; and/or one or more of the atoms or radicals Cl, Br, I, F, $NO_2$, $NH_2$, COOH, SH, $OSO_3H$, $CONH_2$, $NHR_a$, $NR_aR_b$, $COOR_a$, $COR_a$, $CONHR_a$, $OR_a$, $SR_a$, $SO_3R_a$, $OSO_3R_a$, and $R_a$ (in which $R_a$ and $R_b$ represent any alkyl, aryl, hydroaryl, alkaryl or aralkyl group or a heterocyclic radical, including groups containing an unsaturated alkyl radical, which groups or radicals may be further substituted or not and, if more than one is present, may be the same or different). In the said compounds the nuclear alkyl group represented by R in the foregoing formula may be saturated or unsaturated, may contain a straight or branched carbon chain, and may be linked to a carbon atom of the aromatic nucleus through a carbon atom standing at an end of the alkyl carbon chain or at an intermediate point in said carbon chain; it may consist solely of carbon and hydrogen (a hydrocarbon chain), or it may also contain one or more substituent atoms or groups linked to one or more of the carbon atoms of the alkyl radical; as for example, halogen, $NH_2$, SH, COOH, $SO_3H$, OH, $CONH_2$, NHR', COR', COOR', SR', $OSO_3H$, OR', NR''R'', CONHR', CONR''R'', $OSO_3R'$, etc., in which R' and R'' represent any alkyl, aryl, hydro-aryl, aralkyl or alkaryl radical which may or may not be further substituted and which may or may not be the same as the radicals represented by $R_a$ and $R_b$ hereinbefore referred to.

The group represented by S in the foregoing formula may be in the form of the free sulphonic acid or in the form of a salt; for example, a salt resulting either from the replacement of the hydrogen of said sulphonic acid group with its equivalent of a metal or from the addition of ammonia or an organic base.

Various methods have been proposed for the manufacture of such sulphonated hydroxy aromatic compounds, one of which involves sulphonation of an alkyl hydroxy aromatic compound of the type AHR (in which the symbols A, H and R having the meaning defined above) with a sulphonating agent, in the presence or absence of an organic solvent or diluent, and in the presence or absence of a sulphonation assistant. As sulphonating agents there may be employed sulphuric acids of various strengths (e. g. 66° Bé. sulphuric acid, sulphuric acid monohydrate, oleum), chlorsulphonic acid, etc. As solvents or diluents there may be employed halogenated hydrocarbons of the aliphatic and aromatic series, as for example, carbon tetrachloride, dichlorethane, tetrachlorethane, dichlorbenzene, etc. As sulphonation assistants there may be employed the lower organic acids and/or their anhydrous, as for example, acetic acid, acetic anhydride, etc. The sulphonation may be carried out with the aid of heating or cooling, as required, depending upon the ease of sulphonation of the alkyl hydroxy aromatic compound and the sulphonating power of the sulphonating agents, and may be carried to a sufficient extent to result in the properties desired of the final product.

Among the processes proposed for the manufacture of the alkylated hydroxy aromatic compound of the type AHR, one which may be readily employed in practice involves condensation of an alkylating agent with a hydroxy aromatic compound of the type AH; as for example a phenol, a naphthol, a hydroxy heterocyclic aromatic compound (such as hydroxy quinoline) or derivatives thereof. As alkylating agents there have been proposed non-aromatic alcohols (as for example straight-chain, primary monohydric alcohols; straight-chain, secondary monohydric alcohols; branched-chain primary alcohols; branched-chain secondary alcohols; tertiary alcohols of all types, etc.), olefine hydrocarbons containing straight- or branched-chains and containing one or more double bonds which may be variously located in the hydrocarbon, halogen derivatives of the hydrocarbons (as for example, chlorides or bromides of the saturated and unsaturated hydrocarbons of the aliphatic class), etc., and derivatives of all of these, all containing at least 5 carbon atoms in the alkyl chain. The condensation is preferably carried out in the presence of condensing agents, as for example anhydrous zinc chloride, anhydrous aluminum chloride, anhydrous antimonic chloride, anhydrous ferric chloride, zinc, sulphuric acids of various strengths including oleum, etc.; the particular condensing agent and the conditions employed varying with the alkylating agent employed.

The sulphonated hydroxy aromatic compounds may be employed in the form of their free sulphonic acids or in the form of salts. For many purposes they are preferably employed in the form of salts of metals, and especially of the alkali metals (the ammonium radical being considered an alkali metal for the purposes of the present invention), or of organic bases. The salts may be obtained in any suitable manner; for example by reacting the product resulting from the sulphonation of the alkyl hydroxy aromatic compound, either in the crude form or in a purified form, with a metal oxide or hydroxide, ammonia or an organic base, or of a suitable salt of one of these, preferably in an amount adapted to form a neutral product. Suitable bases, oxides and salts proposed for combination with the sulphonated products to produce salts thereof include sodium, potassium and ammonium hydroxides; sodium, potassium and ammonium carbonates and bicarbonates; ammonia, magnesium oxide; ethylamine, pyridine; triethanolamine; propanolamines; butylamines; diamino propanol; ethylenediamine; triethylenetetramine, etc.

For many purposes, the said sulphonated hydroxy aromatic compounds and especially the said alkyl phenol sulphonic acid compounds are employed in neutral, weakly acid, or weakly alkaline, aqueous solutions (that is, solutions which do not react acid to Congo paper or alkaline to Brilliant Yellow paper, and which are referred to in the claims as "approximately neutral" solutions). It has been found, while more acid or more alkaline, aqueous solutions of said products, and particularly of said alkyl phenol sulphonic acid compounds, may be approximately to substantially colorless, in may cases their neutral, weakly acid or weakly alkaline, aqueous solutions have a pink to red to brown coloration.

Such coloration is especially noticeable when the reagents as well as the apparatus employed in the manufacture of said compounds contain iron. The coloration, which is believed to be due to the presence of impurities and especially of iron compounds, is objectionable for many uses of the said products.

It is accordingly the principal object of the present invention to provide a method whereby the color may be improved of neutral, weakly acid and weakly alkaline, aqueous solutions of sulphonated hydroxy aromatic compounds of the above type AHRS, more particularly of alkyl phenol sulphonic acid compounds of the above type

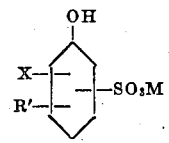

and especially of those of said compounds in which the radicals represented by R and R' contain 12 to 23 carbon atoms in an alkyl hydrocarbon chain. Another object of the present invention is to provide a method whereby the coloring effect on neutral, weakly acid and weakly alkaline, aqueous solutions of sulphonated hydroxy aromatic compounds of the type AHRS, more particularly of alkyl phenol sulphonic acid compounds of the above type

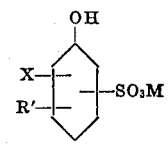

and especially of those of said compounds in which the radicals represented by R and R' contain 12 to 23 carbon atoms in an alkyl hydrocarbon chain, of impurities present in said compounds may be reduced or eliminated.

Other objects of the invention will in part be obvious and will in part appear hereinafter.

According to the present invention, sulphonated hydroxy aromatic compounds of the type AHRS (wherein A, H, R and S have the hereinbefore defined meaning), which have a pink to red to brown coloration in neutral, weakly acid and weakly alkaline, aqueous solutions are treated in aqueous solution with a water-soluble phosphate. As a result of the treatment, the objectionable coloration is diminished or eliminated, and the sulphonated hydroxy aromatic compounds may be recovered from the solution or employed without separation from the solution.

In the practice of the present invention, in accordance with the preferred method of procedure, a sulphonated hydroxy aromatic compound of the type AHRS, as for example an alkyl phenol sulphonic acid compound having the general formula

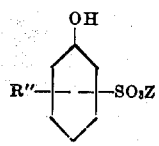

in which R'' represents an alkyl hydrocarbon chain containing 12 to 23 carbon atoms, and Z represents an alkali metal, and which dissolves in water to form a neutral solution which is colored pink or red or brown, is dissolved in water and the solution is made acid to Congo paper. The resulting acid solution is treated with an alkali metal phosphate or other water-soluble inorganic oxygen-acid derivative of phosphorus, preferably added in portions to the agitated solution at an elevated temperature until a test sample of the resulting solution, when made neutral to Delta paper, no longer has the original coloration.

The invention also may be practiced by incorporating an alkali metal phosphate in the solid form with the aromatic hydroxy compound to be purified, also in the solid form, so that when the resulting mixture is added to water or aqueous solutions the color discharging action of the phosphate will come into play and the resulting solutions will be of improved color.

The invention will be illustrated by the following specific examples in which the parts are set out by weight and the temperatures in degrees centigrade.

*Example 1.*—15 to 20 parts of a commercial cetyl phenol sodium sulphonate which dissolves in water to form a neutral aqueous solution having a pink or red or brown color (and which has been obtained by condensing a commercial cetyl alcohol, containing 30 to 40 per cent of normal cetyl alcohol, 30 to 40 per cent of alcohols higher than cetyl, about 10 per cent of normal lauryl alcohol and about 20 per cent of normal myristyl alcohol, with phenol and anhydrous zinc chloride at 160° to 180° under refluxing conditions, followed by sulphonation of the fraction of the resulting product which distills between 195° and 240° at 15 mm. pressure by treatment with excess sulphuric acid and neutralization of the resulting sulphonation mixture with sodium hydroxide) are dissolved in sufficient water to make 100 parts of solution. The solution is made acid to Congo paper by addition of a sufficient amount of acid (for example about 1 part of sulphuric acid or its chemical equivalent of hydrochloric or other acid). Sodium hydrogen ortho phosphate (Na$_2$HPO$_4$), in solid form or in the form of an aqueous solution, is added in small amounts to the resulting acid solution, which is rapidly agitated and which is preferably at a temperature between about 50° and about 60°. The treatment with the phosphate is continued until a sample of the treated solution when neutralized to Delta paper (for example with sodium hydroxide) no longer shows the original coloration. An excess of the sodium hydrogen phosphate may be added, if desired, since its presence does no harm. In general, an addition of about 0.1 part of sodium hydrogen phosphate is sufficient to discharge the objectionable color of the sulphonate in neutral aqueous solution. The resulting purified cetyl phenol sulphonate may be isolated from solution as such or the solution may be neutralized and the sulphonate recovered as its salt in any well known manner, depending upon the form in which it is to be employed. Neutral aqueous solutions of the resulting treated product are generally colorless or tinged very faintly yellow.

*Example 2.*—Dry commercial cetyl phenol sodium sulphonate of the type employed in Example 1 is mixed, for example by grinding with solid sodium hydrogen ortho phosphate (Na$_2$HPO$_4$). The amount of sodium hydrogen phosphate employed relative to the cetyl phenol sodium sulphonate is at least sufficient to discharge the objectionable coloration in accordance with the procedure of Example 1. When the resulting mixture is added to water the sodium hydrogen phosphate causes a discharge of the objectionable color and neutral aqueous solutions of the resulting mixture are colorless or tinged very faintly yellow.

It will be realized by those skilled in the art that the invention is not limited to the details of the foregoing specific examples and that changes may be made in the details of procedure, proportions and nature of materials employed, as well as conditions of the treatment without departing from the scope of the appended patent claims.

Thus, other aromatic hydroxy compounds of the type AHRS (in which A, H, R and S have the hereinbefore defined meaning) which compounds contain impurities which produce a pink to red to brown coloration in neutral, weakly acid and weakly alkaline, aqueous solutions may be treated in accordance with the present invention. The invention is of especial value in connection with the treatment of alkyl phenol sulphonic acid compounds of the type

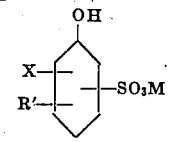

in which X represents hydrogen or a methyl group, R' represents an alkyl hydrocarbon chain which contains at least 5 carbon atoms, and especially 12 to 23 carbon atoms, and M represents hydrogen, an alkali metal (including the ammonium radical) or an organic ammonium radical. The process may be carried out with the sulphonated hydroxy aromatic compound in the form of a salt, as obtained as a product of manufacture, or it may be carried out with solutions of the sulphonated hydroxy aromatic compounds, as obtained in the course of manufacture of said products.

Any convenient concentration of the sulphonated hydroxy aromatic compound may be employed in carrying out the procedure of Example 1 and the treatment may be carried out under neutral, acid or alkaline conditions. The discharge of the objectionable color is produced more rapidly and effectively, however, if the solution is non-alkaline (that is, at least neutral to Delta paper) and still better if acid to Congo paper. The latter reacting condition is accordingly preferred. After the phosphate has completed its decolorizing effect, the solution can be made acid, neutral or alkaline as desired without deleteriously affecting the color in neutral aqueous solutions of the resulting sulphonated hydroxy aromatic compounds. Without limiting the invention to any theory, I believe the objectionable coloration is due to the presence of impurities, probably iron compounds, and that the treatment with the phosphate results in the formation of a phosphate which, when formed, is no longer capable of giving the original colored impurity. In general, in view of the relatively small amount of impurities which produce the coloration in the original products and the relatively small amount of phosphate which need be employed in the discharge of the color, no provision need be made for the removal of by-products of the treatment.

Instead of the sodium hydrogen phosphate employed in the above examples other water-soluble phosphates may be employed, as for example, ortho-phosphoric acid, meta-phosphoric acid, pyro-phosphoric acid and the other water-soluble alkali-metal salts (including ammonium salts) of said acids, and especially the mono- and tri-sodium ortho phosphates and the other mono-, di-, or tri- alkali metal salts of ortho phosphoric acid (including the ammonium salts).

The temperature at which the treatment is carried out may be varied but inasmuch as the rate of the color discharge reaction increases with temperature and is very rapid at temperatures above 50°, elevated temperatures are preferably employed. A convenient method of treatment includes addition of the phosphate to the solution of the sulphonated hydroxy aromatic compound which is at a temperature between about 50° and 70°.

I claim:

1. A method of improving the color of a sulphonated hydroxy aromatic compound of the type AHRS, in which A represents an aromatic nucleus which may contain substituents, H represents a nuclear hydroxyl group, R represents a nuclear alkyl group containing at least 5 carbon atoms, and S represents a nuclear sulphonic acid group in the form of the free acid or a salt, which compound forms approximately neutral aqueous solutions having a pink to red to brown color, which comprises treating said compound with a water-soluble phosphate.

2. A method of improving the color of a sulphonated hydroxy aromatic compound of the type AHRS, in which A represents an aromatic nucleus which may contain substituents, H represents a nuclear hydroxyl group, R represents a nuclear alkyl group containing at least 5 carbon atoms, and S represents a nuclear sulphonic acid group in the form of the free acid or a salt, which compound forms approximately neutral aqueous solutions having a pink to red to brown color, which comprises treating said compound in aqueous solution with a water-soluble phosphate.

3. A method of improving the color of a sulphonated hydroxy aromatic compound of the type AHRS, in which A represents an aromatic nucleus which may contain substituents, H represents a nuclear hydroxyl group, R represents a nuclear alkyl group containing at least 5 carbon atoms, and S represents a nuclear sulphonic acid group in the form of the free acid or a salt, which compound forms approximately neutral aqueous solutions having a pink to red to brown color, which comprises treating said compound in a non-alkaline solution with an alkali-metal phosphate in amount at least such that the color in approximately neutral aqueous solutions is substantially discharged.

4. A method of improving the color of a sulphonated hydroxy aromatic compound of the type AHRS, in which A represents an aromatic nucleus which may contain substituents, H represents a nuclear hydroxyl group, R represents a nuclear alkyl group containing at least 5 carbon atoms, and S represents a nuclear sulphonic acid group in the form of the free acid or a salt, which compound forms approximately neutral aqueous solutions having a pink to red to brown color, which comprises treating said compound in acid solution with an alkali-metal phosphate in amount at least such that the color in approximately neutral aqueous solutions is substantially discharged.

5. A method of improving the color of an alkyl phenol sulphonic acid compound having the general formula

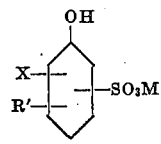

in which X represents hydrogen or a methyl group, R' represents an alkyl radical containing at least 5 carbon atoms, and M represents hydrogen, an alkali-metal or an organic ammonium radical, which compound contains impurities which produce a pink to red to brown coloration of approximately neutral aqueous solutions of said compound, which comprises treating said compound with a water-soluble phosphate.

6. A method of improving the color of an alkyl phenol sulphonic acid compound having the general formula

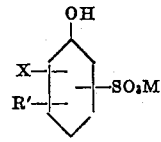

in which X represents hydrogen or a methyl group, R' represents an alkyl radical containing at least 5 carbon atoms, and M represents hydrogen, an alkali-metal or an organic ammonium radical, which compound contains impurities which produce a pink to red to brown coloration of approximately neutral aqueous solutions of said compound, which comprises treating a soluton of said compound with a water-soluble phosphate.

7. A method of improving the color of an alkyl phenol sulphonic acid compound having the general formula

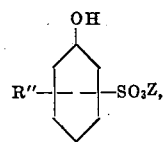

in which R'' represents an alkyl hydrocarbon radical containing at least 12 carbon atoms, and Z represents hydrogen or an alkali-metal, which compound contains impurities which produce a pink to red to brown coloration of approximately neutral aqueous solutions of said compound, which comprises treating said compound in aqueous solution with an alkali-metal phosphate.

8. A method of improving the color of an alkyl phenol sulphonic acid compound having the general formula

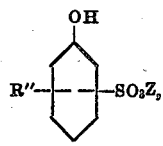

in which R" represents an alkyl hydrocarbon radical containing 12 to 23 carbon atoms, and Z represents hydrogen or an alkali-metal, which compound contains impurities which produce a pink to red to brown coloration of approximately neutral aqueous solutions which comprises treating said compound in acid solution and at a temperature above 50° C. with a water-soluble phosphate in amount at least such that the color in approximately neutral aqueous solutions is substantially discharged.

9. A method of improving the color of an alkyl phenol sulphonic acid compound having the general formula

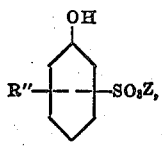

in which R" represents an alkyl hydrocarbon radical containing 12 to 23 carbon atoms, and Z represents hydrogen or an alkali-metal, which compound contains impurities which produce a pink to red to brown coloration of approximately neutral aqueous solutions which comprises treating said compound in acid solution and at a temperature above 50° C. with an alkali-metal phosphate in amount at least such that the color in approximately neutral aqueous solutions is substantially discharged.

10. A method of improving the color of an alkyl phenol sulphonic acid compound having the general formula

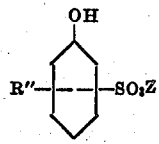

in which R" represents an alkyl hydrocarbon radical containing 12 to 23 carbon atoms, and Z represents hydrogen or an alkali-metal, which compound contains impurities which produce a pink to red to brown coloration of approximately neutral aqueous solutions of said compound, which comprises treating said compound in said solution and at a temperature between about 50° C. and about 70° C. with a sodium hydrogen ortho phosphate in small amounts until the color in approximately neutral aqueous solutions is substantially discharged.

11. A composition of matter adapted to form substantially colorless solutions when converted into approximately neutral aqueous solutions comprising a water-soluble phosphate in admixture with a sulphonated hydroxy aromatic compound of the type AHRS, in which A represents an aromatic nucleus which may contain substituents, H represents a nuclear hydroxyl group, R represents a nuclear alkyl group containing at least 5 carbon atoms, and S represents a nuclear sulphonic acid group in the form of the free acid or a salt, which compound forms approximately neutral aqueous solutions having a pink to red to brown color.

12. A composition of matter adapted to form substantially colorless solutions when converted into approximately neutral aqueous solutions comprising a sodium hydrogen phosphate in admixture with a sulphonated hydroxy aromatic compound of the type AHRS, in which A represents an aromatic nucleus which may contain substituents, H represents a nuclear hydroxyl group, R represents a nuclear alkyl group containing at least 5 carbon atoms, and S represents a nuclear sulphonic acid group in the form of the free acid or a salt, which compound forms approximately neutral aqueous solutions having a pink to red to brown color.

13. A composition of matter adapted to form substantially colorless solutions when converted into approximately neutral aqueous solutions comprising a small amount of an alkali-metal phosphate in admixture with an alkyl phenol sulphonic acid compound having the general formula

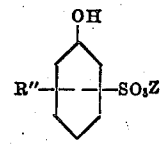

in which R" represents an alkyl hydrocarbon radical containing at least 12 carbon atoms, and Z represents hydrogen or an alkali-metal, which compound contains impurities which produce a pink to red to brown coloration of approximately neutral aqueous solutions of said compound, the amount of alkali-metal phosphate being at least sufficient to substantially discharge the color of said solutions.

14. A composition of matter adapted to form substantially colorless solutions when converted into approximately neutral aqueous solutions comprising a small amount of a sodium hydrogen phosphate in admixture with an alkyl phenol sulphonate having the following probable general formula:

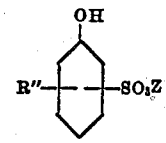

in which R" represents a hydrocarbon radical of the aliphatic series containing 12 to 23 carbon atoms, and Z represents hydrogen or an alkali-metal, said alkyl phenol sulphonate containing impurities which produce a pink to red to brown coloration of approximately neutral aqueous solution of said sulphonate, the amount of sodium hydrogen phosphate being at least sufficient to substantially discharge the color of said solutions.

BRYAN L. RAUSCHERT.